I. M. WEST.
Instruments for Measuring Cloth in the Roll.

No. 156,395.                                         Patented Oct. 27, 1874.

UNITED STATES PATENT OFFICE.

ISAIAH M. WEST, OF WILMINGTON, OHIO.

IMPROVEMENT IN INSTRUMENTS FOR MEASURING CLOTH IN THE ROLL.

Specification forming part of Letters Patent No. 156,395, dated October 27, 1874; application filed August 17, 1874.

*To all whom it may concern:*

Be it known that I, ISAIAH M. WEST, of Wilmington, in the county of Clinton and State of Ohio, have invented a certain new and useful Improvement in Instruments for Measuring Cloth in the Roll; and I do hereby declare the following to be a full, clear, and exact description of the invention, such as will enable others skilled in the art to which it pertains to make and use it, reference being had to the accompanying drawings, which form part of this specification, in which—

Figure 1:
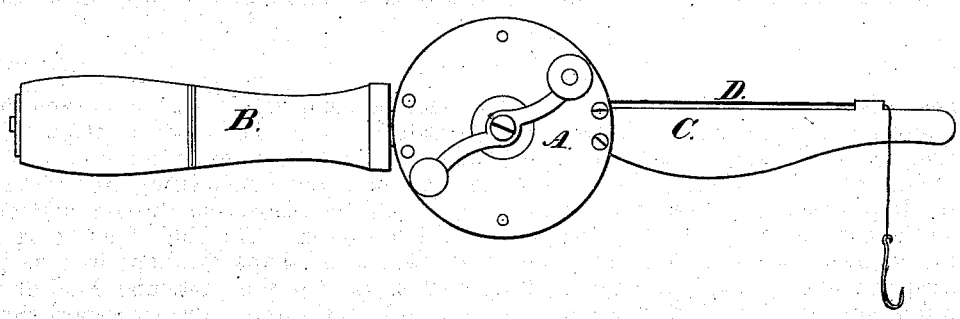
Figure 2:
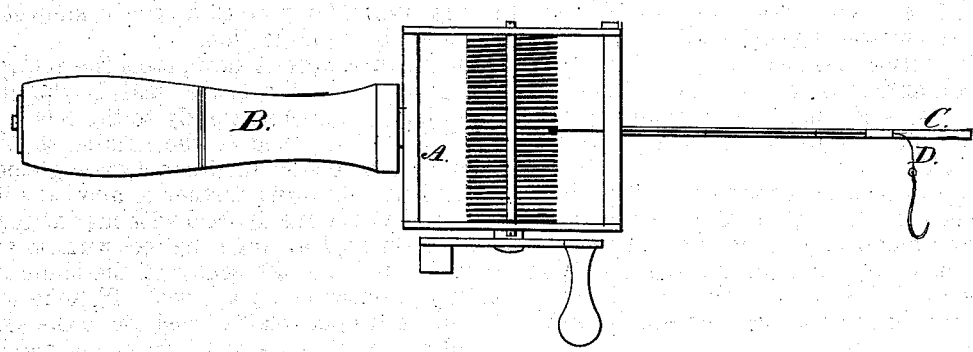

Figure 1 is a side view, and Fig. 2 a top view, of the measuring instrument.

This invention has relation to an improvement upon an instrument for measuring cloth in the rolls, said instrument comprising a measuring line or reel, a blade to lay the line, and a handle.

The improvement consists essentially in the arrangement of the reel at right angles to the handle and blade, and in the swiveling or pivoting of said reel and handle together, the object being to insure the uniform delivery of the line and effectually prevent its entanglement.

For the purposes of my invention I provide a suitable measuring-line of tape, cord, or other material, the character of which may accord with the quality of goods to be measured. Upon this line I indicate the intervals of yards, feet, &c., and attach to its outer end a hook, by attaching which to the end of the roll or bolt I am enabled, by a suitable instrument, to lay said line evenly upon the coils or folds in succession, and thus, without unrolling or unwinding the goods, to obtain the measurement in yards, feet, and inches, and to perform the operation when the goods are in piles upon the shelves, or in other positions that would preclude, without great inconvenience, their measurement by other methods.

The instrument which I have invented for the purpose of laying the line according to my method comprises a reel, a suitable handle, and a blade. The blade is employed in conveying the line between the coils or folds of the cloth, said line passing from the reel-shaft along the blade, and through a suitable eye in the latter. The blade may be of any suitable size or shape to adapt it to its particular use and to the particular kind of material to be measured. Proper regard should also be paid to the construction of the blade with reference to character of the line; but these details I do not deem it necessary to describe particularly, as they will be subject to considerable modification.

In the drawings, A designates the reel; B, the handle; C, the blade, and D the line. The blade is attached rigidly to the reel; but the latter is swiveled to the handle, so as to turn with the blade and prevent entanglement of the line. In order further to allow the line to be delivered evenly, and without danger of entanglement, I arrange the reel with its axis at right angles to the center of the blade and handle; consequently the reel will keep with the line a proper relative position to the knife in all the movements and turnings of the latter. If the parts were otherwise arranged, the line, especially if it were tape, would be continuously liable to entanglement, and could not be prevented from wrapping around the knife.

I claim—

In an instrument for measuring cloth, the reel A, arranged at right angles with the handle B and blade C, said reel and handle being swiveled together, substantially as described and shown, and for the purpose set forth.

In testimony that I claim the foregoing I have hereunto set my hand this 10th day of August, 1874.

ISAIAH M. WEST.

Witnesses:
 EDWARD J. WEST,
 B. T. WHINERY.